US012422190B2

United States Patent

(12) Sun et al.

(10) Patent No.: US 12,422,190 B2
(45) Date of Patent: *Sep. 23, 2025

(54) ENVIRONMENTALLY-FRIENDLY FEED DRYING AND COOLING INTEGRATED MACHINE

(71) Applicant: GUANGZHOU JP.EPE.CO., LTD., Guangdong (CN)

(72) Inventors: Shaotang Sun, Guangdong (CN); Longbing Wu, Guangdong (CN)

(73) Assignee: GUANGZHOU JP.EPE.CO., LTD., Guangdong (CN)

(*) Notice: Subject to any disclaimer, the term of this patent is extended or adjusted under 35 U.S.C. 154(b) by 411 days.

This patent is subject to a terminal disclaimer.

(21) Appl. No.: 17/758,705

(22) PCT Filed: Dec. 8, 2020

(86) PCT No.: PCT/CN2020/134468
§ 371 (c)(1),
(2) Date: Jul. 13, 2022

(87) PCT Pub. No.: WO2022/011938
PCT Pub. Date: Jan. 20, 2022

(65) Prior Publication Data
US 2023/0128608 A1 Apr. 27, 2023

(30) Foreign Application Priority Data
Jul. 13, 2020 (CN) ......................... 202010668189.7

(51) Int. Cl.
*F26B 25/00* (2006.01)
*F26B 21/00* (2006.01)
(Continued)

(52) U.S. Cl.
CPC .......... *F26B 25/002* (2013.01); *F26B 21/001* (2013.01); *F26B 21/003* (2013.01);
(Continued)

(58) Field of Classification Search
CPC ...... F26B 25/002; F26B 25/007; F26B 25/06; F26B 21/001; F26B 21/003; F26B 21/004; F26B 21/04; F26B 21/086
(Continued)

(56) References Cited

U.S. PATENT DOCUMENTS 6,163,976 A * 12/2000 Tada ....................... F26B 5/041 34/92
6,581,394 B1 * 6/2003 Smolenskiy ......... B01D 53/265 62/402
(Continued)

FOREIGN PATENT DOCUMENTS

CN 106152711 A 11/2016
CN 207556131 U 6/2018
(Continued)

OTHER PUBLICATIONS

International Search Report issued in PCT/CN2020/134468 dated Apr. 21, 2021.

*Primary Examiner* — Stephen M Gravini
(74) *Attorney, Agent, or Firm* — DLA PIPER LLP (US)

(57) ABSTRACT

An environmentally-friendly feed drying and cooling integrated machine, comprising a material drying unit, a material cooling unit and a gas treatment unit, wherein the material drying unit comprises a drying box group (1) and a heating box body module (2); the heating box body module (2) is used for carrying out a drying treatment on materials in the drying box group (1); the material cooling unit is connected to the drying box group (1), receives the materials from the drying box group (1), and carries out a cooling
(Continued)

treatment on the materials; two ends of the gas treatment unit are respectively connected to the drying box group (1) and the material cooling unit; the gas treatment unit receives gas discharged from the drying box group (1), carries out a temperature reduction and dehumidification treatment on the gas, and then conveys the gas to the material cooling unit.

10 Claims, 2 Drawing Sheets

(51) Int. Cl.
*F26B 21/04* (2006.01)
*F26B 21/08* (2006.01)
*F26B 25/06* (2006.01)

(52) U.S. Cl.
CPC ............ *F26B 21/004* (2013.01); *F26B 21/04* (2013.01); *F26B 21/086* (2013.01); *F26B 25/007* (2013.01); *F26B 25/06* (2013.01)

(58) Field of Classification Search
USPC .............................................................. 34/74
See application file for complete search history.

(56) References Cited

U.S. PATENT DOCUMENTS

| | | | | |
|---|---|---|---|---|
| 10,753,684 | B2 | 8/2020 | Ringdal et al. | |
| 10,914,477 | B2 * | 2/2021 | Braun | F24F 3/14 |
| 10,974,191 | B2 * | 4/2021 | Yuan | B01D 46/00 |
| 11,435,140 | B2 * | 9/2022 | Tanaka | F26B 9/063 |
| 11,800,690 | B1 * | 10/2023 | Osterkamp | F26B 21/086 |
| 11,852,410 | B2 * | 12/2023 | Li | B01D 46/121 |
| 12,130,083 | B1 * | 10/2024 | Goldberg | F26B 3/0923 |
| 2005/0120715 | A1 * | 6/2005 | Labrador | F03G 7/00 60/618 |
| 2019/0107327 | A1 | 4/2019 | Ringdal et al. | |
| 2023/0074336 | A1 * | 3/2023 | Sun | F26B 23/002 |
| 2023/0128608 | A1 * | 4/2023 | Sun | F26B 21/001 34/74 |
| 2024/0180065 | A1 * | 6/2024 | Pietersz | A01C 1/02 |
| 2025/0075975 | A1 * | 3/2025 | Chen | F26B 3/16 |

FOREIGN PATENT DOCUMENTS

| | | | | | |
|---|---|---|---|---|---|
| CN | 109909048 | A | | 6/2019 | |
| CN | 111578670 | A | * | 8/2020 | A23N 17/00 |
| CN | 111578671 | A | | 8/2020 | |
| CN | 111707085 | A | | 9/2020 | |
| CN | 111707086 | A | | 9/2020 | |
| CN | 212362759 | U | | 1/2021 | |
| CN | 212482015 | U | | 2/2021 | |
| DE | 112020005882 | T5 | * | 11/2022 | A23N 17/00 |
| WO | WO-2021227464 | A1 | * | 11/2021 | A23N 17/00 |

* cited by examiner

ENVIRONMENTALLY-FRIENDLY FEED DRYING AND COOLING INTEGRATED MACHINE

CROSS REFERENCE TO RELATED APPLICATION

This patent application is a national stage entry of PCT/CN2020/134468, filed Dec. 8, 2020, which claims the benefit and priority of Chinese Patent Application No. 202010668189.7, filed on Jul. 13, 2020, the disclosures of which is incorporated by reference herein in its entirety as part of the present application.

TECHNICAL FIELD

The present disclosure relates to the technical field of feed production, in particular to a new environmentally-friendly feed drying and cooling integrated machine.

BACKGROUND ART

With continuous improvement of living standards of people, the demand for poultry meat products is increasing. Therefore, rapid development is brought to the breeding industry, and correspondingly the development of feed industry is promoted. In the feed production process, feed needs to be dried, and the treatment method is mainly to remove moisture in the feed through high-temperature drying gas. The high-temperature drying gas absorbs the moisture of the feed, and then the moisture is turned into damp hot waste gas carried with peculiar smell. According to statistics, in a production line producing 10 tons of feed per hour, approximately 35000 $m^3$ to 45000 $m^3$ of damp hot waste gas is discharged in one hour, and approximately 30000 $m^3$ to 35000 $m^3$ of damp hot waste gas is discharged in one hour in the corresponding cooling step. The dried damp hot waste gas is harmful to the environment and human health. For the treatment of the damp hot waste gas, the damp hot waste gas is usually purified and then discharged into the atmosphere. Special purification equipment is required for a purification treatment, and the equipment is large in occupied space and high in cost. Nevertheless, some harmful substances still exist in the discharged damp hot waste gas, and the “zero discharge” standard cannot be reached. Meanwhile, the dried feed is relatively high in temperature and cannot directly enter the subsequent process.

SUMMARY

The present disclosure provides a new environmentally-friendly feed drying and cooling integrated machine. Gas cycle use can be realized, zero discharge of waste gas in the production process is realized, the pollution to the surrounding atmospheric environment is eliminated, and the environmental benefits are high.

A new environmentally-friendly feed drying and cooling integrated machine provided by an embodiment comprises:

a material drying unit, comprising a drying box group and a heating box body module, and the heating box body module being used for carrying out a drying treatment on materials in the drying box group so as to reduce the content of moisture in the materials;

a material cooling unit, connected to the drying box group, receiving the materials from the drying box group, and carrying out a cooling treatment on the materials; and a gas treatment unit, two ends of the gas treatment unit being respectively connected to the drying box group and the material cooling unit, and the gas treatment unit receiving gas discharged from the drying box group, carrying out a temperature reduction and dehumidification treatment on the gas, and then conveying the gas to the material cooling unit, so that zero discharge of waste gas is realized, and the production process of the drying unit and the cooling unit and the environmental protection of waste gas purification are integrated; and the gas cyclically circulates through the material cooling unit, the gas drying unit and the gas treatment unit in sequence, and the gas can respectively carry out a drying treatment and heat exchange with materials in the material drying unit and the materials in the material cooling unit.

Optionally, the gas treatment unit comprises a dust removal box body and a temperature reduction and dehumidification module, the dust removal box body is connected with the drying box group, the dust removal box body receives the gas discharged from the drying box group and carries out a dust removal treatment on the gas, two ends of the temperature reduction and dehumidification module are respectively connected with the dust removal box body and the material cooling unit, the temperature reduction and dehumidification module receives gas discharged from the dust removal box body, carries out a temperature reduction and dehumidification treatment on the gas, and then conveys the gas to the material cooling unit.

Optionally, the drying box group comprises a plurality of drying boxes which are connected end to end in sequence, the two drying boxes located at two ends are respectively connected with the gas treatment unit and the material cooling unit, and the materials are conveyed to the end, close to the material cooling unit, of the drying box group from the end, close to the gas treatment unit, of the drying box group.

Optionally, the drying boxes are distributed in a stack-up mode along the vertical direction, and the materials are conveyed to the drying box located at the bottom from the dying box located at the top in sequence.

Optionally, the material drying unit further comprises a gas inner cycle channel, the drying boxes are in pairs, the two drying boxes in each group are both connected with the gas inner cycle channel, and at least part of the gas can cyclically circulate in the two drying boxes through the gas inner cycle channel.

Optionally, the heating box body module comprises dehumidification equipment and heating equipment, the dehumidification equipment and the heating equipment are both arranged on the gas inner cycle channel, and the dehumidification equipment and the heating equipment respectively carry out a dehumidification treatment and a heating treatment on the gas in the gas inner cycle channel.

Optionally, the dehumidification equipment is a condenser, the heating equipment is a steam exchanger, the steam exchanger is located on the side close to the outlet end of the gas inner cycle channel, the condenser is located on the side close to the inlet end of the gas inner cycle channel, a filter is further arranged between the condenser and the inlet end of the gas inner cycle channel, and the filter is used for carrying out a filtration treatment on the gas in the gas inner cycle channel.

Optionally, the heating box body module further comprises a dust removal device, and the dust removal device is used for carrying out a dust removal treatment on the gas in the gas inner cycle channel.

Optionally, an air door adjusting valve is arranged between the material drying unit and the gas treatment unit, and the air door adjusting valve is used for controlling the flow of the gas conveyed to the gas treatment unit from the material drying unit.

Optionally, the new environmentally-friendly feed drying and cooling integrated machine further comprises an air supplementing device, and the air supplementing device is connected with the material cooling unit.

According to the new environmentally-friendly feed drying and cooling integrated machine in the present disclosure, the gas treatment unit is arranged, two ends of the gas treatment unit are respectively connected with the material drying unit and the material cooling unit, so that the gas cyclically circulates through the material drying unit, the gas treatment unit and the material cooling unit in sequence. A drying and cooling treatment on feed is realized through heat exchange between the gas and the feed, so that the gas is avoided from being exhausted into the environment, "zero discharge" of waste gas is realized, and the integrated machine has the characteristic of high environmental protection.

Reference Signs:

1, drying box group; 10, drying box; 101, material discharge mechanism; 102, air duct; 11, feed inlet; 12, blanking hopper; 13, material conveying pipeline; 14, return air duct; 2, heating box body module; 20, gas inner cycle channel; 21, dehumidification equipment; 22, heating equipment; 23, dust removal device; 24, draught fan; 3, dust removal box body; 4, temperature reduction and dehumidification module; 40, filter mechanism; 41, first-stage surface cooler; 42, second-stage surface cooler; 43, heat regenerator; 5, air door adjusting valve; 6, air supplementing device; 7, gas pipeline; and 8, vertical cooling machine.

DETAILED DESCRIPTION OF THE EMBODIMENTS

Figure 1:
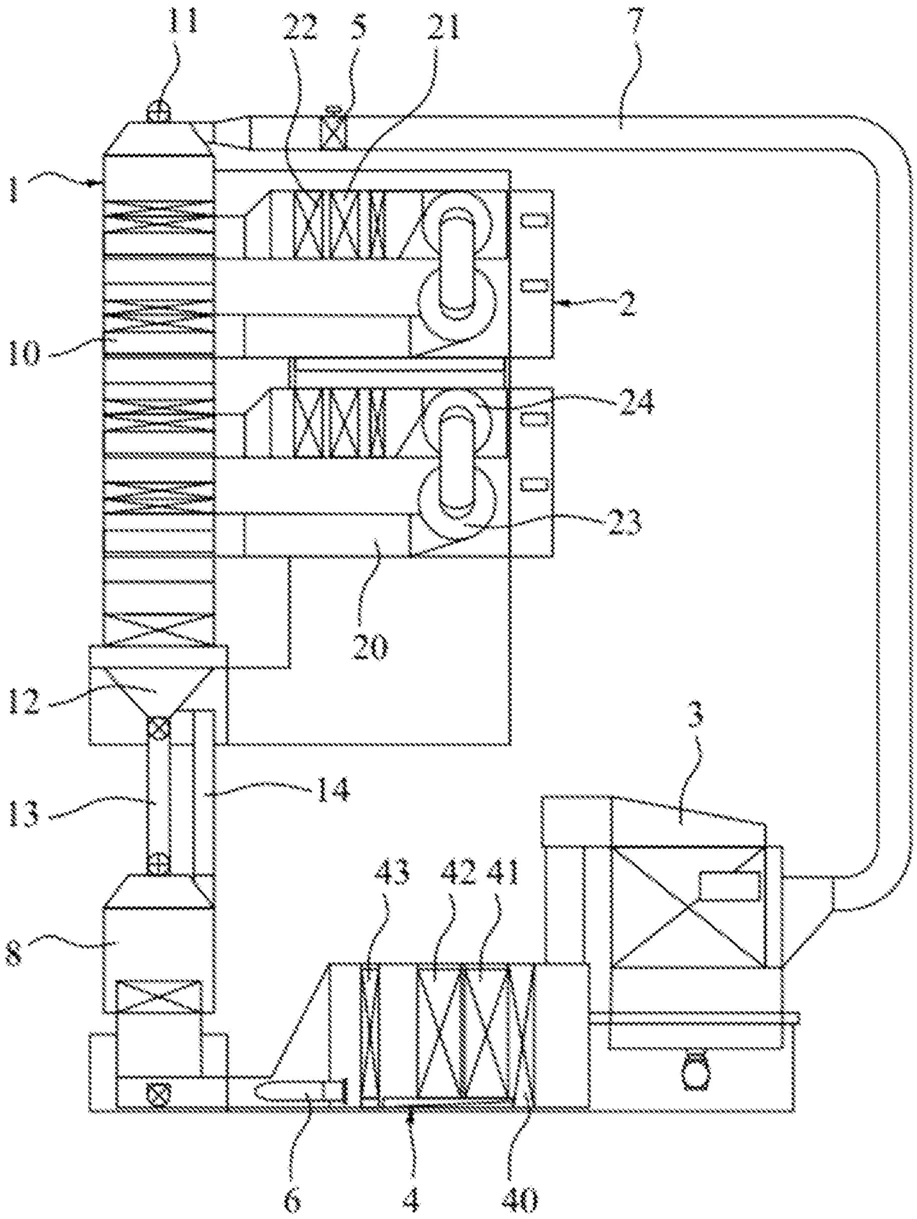
FIG. 1 is a front view of a new environmentally-friendly feed drying and cooling integrated machine in the embodiment.
Figure 2:
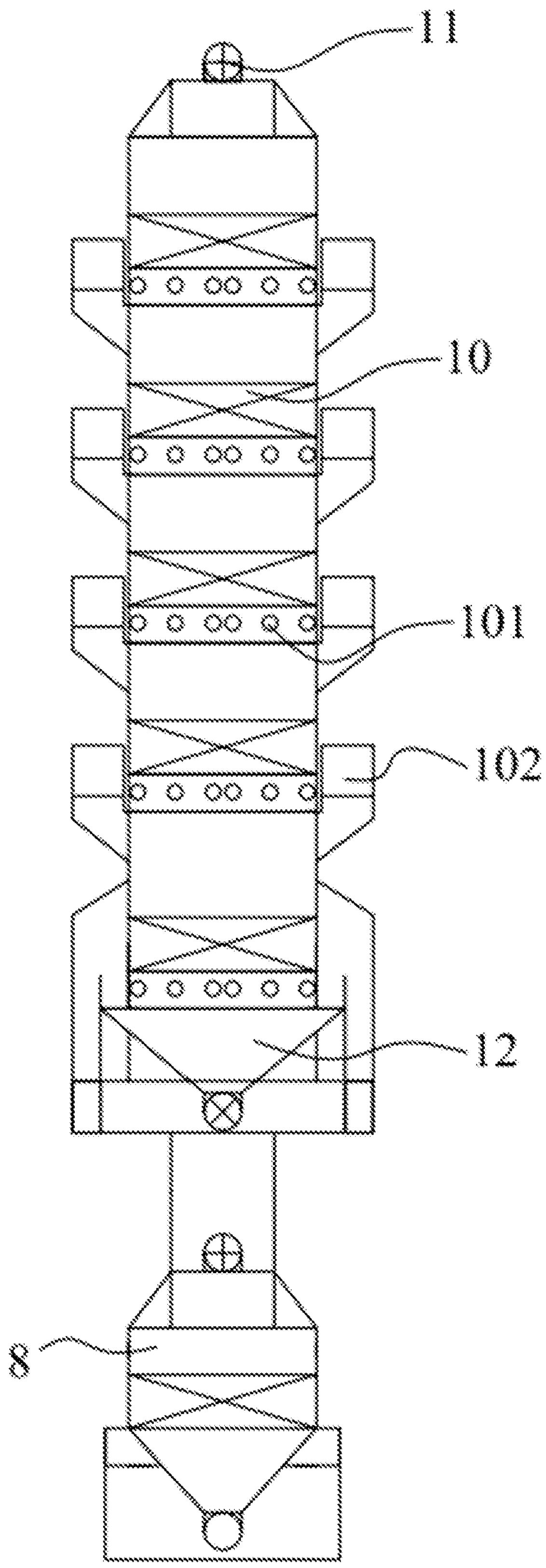
FIG. 2 is a side view of a drying box group in the embodiment.

As shown in FIG. 1 and FIG. 2, an environmentally-friendly feed drying and cooling integrated machine provided by the present disclosure comprises a material drying unit, a material cooling unit and a gas treatment unit, wherein the material drying unit comprises a drying box group 1 and a heating box body module 2; the heating box body module 2 is used for carrying out a drying treatment on materials in the drying box group 1; the material cooling unit is connected to the drying box group 1, receives the materials from the drying box group 1, and carries out a cooling treatment on the materials; two ends of the gas treatment unit are respectively connected to the drying box group 1 and the material cooling unit; the gas treatment unit receives gas discharged from the drying box group 1, carries out a temperature reduction and dehumidification treatment on the gas, and then conveys the gas to the material cooling unit; and the gas cyclically circulates through the material drying unit, the gas treatment unit and the material cooling unit in sequence, and the gas can respectively carry out a drying treatment and heat exchange with materials in the material drying unit and the materials in the material cooling unit. In the embodiment, the new environmentally-friendly feed drying and cooling integrated machine is used for carrying out a drying and cooling treatment on feed. The function of the material drying unit is to dry the feed. The material drying unit comprises a drying box group 1 and a heating box body module 2. The drying box group 1 is used for temporarily storing and conveying the feed. The function of the heating box body module 2 is to heat air in the drying box group 1 to form hot dry gas. The hot dry gas exchanges heat with the feed in the drying box group 1 so as to evaporate moisture in the feed and be combined with the hot dry gas to form damp hot gas. The damp hot gas enters the gas treatment unit from the drying box group 1. The function of the gas treatment unit is to carry out the temperature reduction and dehumidification treatment on the damp hot gas from the drying box group 1 to form dry cold gas, and the dry cold gas is conveyed into the material cooling unit. The function of the material cooling unit is to receive the feed from the drying box group 1 and the dry cold gas from the gas treatment unit and to carry out the cooling treatment on the dry cold gas. The dry cold gas after the cooling treatment absorbs heat in the feed to form the hot dry gas, and the hot dry gas is conveyed into the drying box group 1 to be recycled. The feed after the drying and cooling treatment is discharged from the material cooling unit. In the embodiment, the gas treatment unit is arranged, two ends of the gas treatment unit are respectively connected with the material drying unit and the material cooling unit, so that the gas cyclically circulates through the material drying unit, the gas treatment unit and the material cooling unit in sequence. A drying and cooling treatment on the feed is realized through heat exchange between the gas and the feed, so that the gas is avoided from being exhausted into the environment, "zero discharge" of waste gas in the production process is realized, the pollution to the surrounding atmospheric environment is eliminated, and the integrated machine has the characteristic of high environmental protection.

Exemplarily, the gas treatment unit comprises a dust removal box body 3 and a temperature reduction and dehumidification module 4. The dust removal box body 3 is connected with the drying box group 1. The dust removal box body 3 receives the gas discharged from the drying box group 1 and carries out a dust removal treatment on the gas. Two ends of the temperature reduction and dehumidification module 4 are respectively connected with the dust removal box body 3 and the material cooling unit. The temperature reduction and dehumidification module 4 receives gas discharged from the dust removal box body 3, carries out a temperature reduction and dehumidification treatment on the gas, and then conveys the gas to the material cooling unit. In the embodiment, the dust removal box body 3 comprises a dust remover, a draught fan, an explosion-proof device and a waste screw auger conveyor. The damp hot gas discharged from the drying box group 1 is carried with solid impurities. The damp hot gas enters the dust removal box 3. The draught fan drives the damp hot gas to flow along a set flow path. The dust remover carries out dust removal and filtration on the damp hot gas. The filtered solid impurities are discharged through the waste screw auger conveyor. The filtered damp hot gas enters the temperature reduction and dehumidification module 4 along a connecting pipeline under the driving of the draught fan. The temperature reduction and dehumidification module 4 comprises a filter mechanism 40, a first-stage surface cooler 41, a second-stage surface cooler 42 and a heat regenerator 43 which are connected in sequence. The filter mechanism 40 is connected with the outlet end of the dust removal box body 3, and filter mechanism 40 filters the damp hot gas from the dust removal box body 3, so that the impurities in the gas are further eliminated. The filtered damp hot gas enters the first-stage surface cooler 41 and the second-stage surface cooler 42 in sequence for temperature reduction and dehumidification. The first-stage surface cooler 41 and the second-stage surface cooler 42 are filled with cold water. The damp hot gas exchanges heat with the cold water in the first-stage surface cooler 41 and the second-stage surface cooler 42. After the temperature is reduced, moisture in the gas is condensed and discharged to form dry cold gas. The dry cold gas enters the heat regenerator 43 for heat regeneration, reaches a set temperature, and is conveyed into the material cooling unit.

Optionally, the material cooling unit comprises a vertical cooling machine 8, and two ends of the vertical cooling machine 8 are respectively connected with the heat regenerator 43 and the drying box group 1. The dried feed enters the vertical cooling machine 8. The gas discharged from the regenerator 43 enters the vertical cooling machine 8. The gas exchanges heat with the feed and absorbs the heat of the feed, so that the temperature of the feed is reduced, and the cooling treatment on the feed is realized. The treated feed is discharged through a discharge opening. The temperature of the gas after heat absorption is increased, and the gas is conveyed into the drying box group 1. Therefore, recycling of heat energy is facilitated.

Optionally, the drying box group 1 comprises a plurality of drying boxes 10 which are connected end to end in sequence. The two drying boxes 10 located at two ends are respectively connected with the gas treatment unit and the material cooling unit. The materials are conveyed to the end, close to the material cooling unit, of the drying box group 1 from the end, close to the gas treatment unit, of the drying box group 1. It is understandable that the device is provided with the drying boxes 10 among which the materials are conveyed, so that the tumbling of the materials and the expansion of the spreading surface of the materials are facilitated, and the drying efficiency is improved.

Optionally, the conveying direction of the materials in the drying box group 1 is opposite to the circulation direction of the gas. The conveying direction of the materials is opposite to the circulation direction of the gas, so that the separation of the powdery impurities in the materials from the materials through the flow of the gas can be promoted, and the function of removing the impurities in the materials is achieved.

Optionally, the drying boxes 10 are distributed in a stack-up mode along the vertical direction, and the materials are conveyed to the drying box 10 located at the bottom from the dying box 10 located at the top. In the embodiment, the drying box 10 located at the top is a top drying box, and the drying box 10 located at the bottom is a bottom drying box. A plurality of middle drying boxes are arranged between the top drying box and the bottom drying box. The drying box 10 is provided with a material discharge mechanism 101, and in every two adjacent drying boxes 10, the feed can be discharged from one of the drying boxes 10 into the other of the drying boxes 10 through the material discharge mechanism 101. The top drying box is provided with a feed inlet 11, and the bottom drying box is provided with a blanking hopper 12. The feed enters the top drying box from the feed inlet 11, drives the feed along the top drying box, the middle drying boxes and the bottom drying box in sequence through the material discharge mechanism 101, and is discharged through the blanking hopper 12. The hot dry gas circulates from the bottom drying box to one side of the top drying box, and the drying treatment is carried out on the feed through the hot dry gas.

Optionally, the material drying unit further comprises a gas inner cycle channel 20, the drying boxes 10 are in pairs, the two drying boxes 10 in each group are both connected with the gas inner cycle channel 20, and at least part of the gas can cyclically circulate in the two drying boxes 10 through the gas inner cycle channel 20. It is understandable that the materials are conveyed from the first end to the second end of the drying box group 1. The hot dry gas is conveyed from the second end to the first end of the drying box group 1. Heat exchange is carried out on the materials with the hot dry gas in the drying box group 1, and then the drying treatment on the materials is achieved. The gas after heat exchange is successively discharged into the gas treatment unit and the material cooling unit for recycling. The gas inner cycle channel 20 is arranged, so that part of the gas in the two drying boxes 10 cyclically circulates. Therefore, the heat energy carried in the gas is fully utilized, and the drying efficiency is improved.

Optionally, the heating box body module 2 comprises dehumidification equipment 21 and heating equipment 22. The dehumidification equipment 21 and the heating equipment 22 are both arranged on the gas inner cycle channel 20. The dehumidification equipment 21 and the heating equipment 22 respectively carry out a dehumidification treatment and a heating treatment on the gas in the gas inner cycle channel 20. In the material drying treatment process of the gas in the gas inner cycle channel 20, a large amount of moisture is increased while the temperature is reduced. The dehumidification treatment and the heating treatment are carried out on the gas in the gas inner cycle channel 20, so that the gas in the drying box group 1 is maintained in a hot dry state for a long time to improve the drying efficiency.

Optionally, the heating box body module 2 further comprises a dust removal device 23, and the dust removal device 23 is used for carrying out a dust removal treatment on the gas in the gas inner cycle channel 20. In the material drying treatment process of the gas in the gas inner cycle channel 20, a large quantity of dust impurities are carried, and the dust impurities are cleaned through the dust removal device 23.

In a specific embodiment, referring to FIG. 1, the drying box group 1 comprises a bottom drying box, a plurality of middle drying boxes and a top drying box which are arranged in a stack-up mode along the vertical direction in sequence, and each drying box 10 is provided with a material discharge mechanism 101. The bottom drying box is provided with a blanking hopper 12. The blanking hopper 12 is connected with the material cooling unit through a material conveying pipeline 13. The top drying box is provided with a feed inlet 11. The feed enters the top drying box from the feed inlet 11. Moreover, the materials are conveyed from one end of the top drying box to one end of the bottom drying box through the material discharge mechanism 101, and finally conveyed to the material cooling unit through the blanking hopper 12. The drying boxes 10 are in pairs to form a box body assembly. Each box body assembly is provided with a gas inner cycle channel 20. Air ducts 102 are arranged on two sides of the drying box 10 along the horizontal direction. Two ends of the gas inner cycle channel 20 communicate with the two drying boxes in the box body assembly through the air ducts 102, so that part of the gas can cyclically circulates between the two drying boxes 10 through the gas inner cycle channel 20. The heating box body module 2 comprises dehumidification equipment 21, heating equipment, a dust removal device 23, a filter and a draught fan 24, wherein the dehumidification equipment 21 is a condenser, the heating equipment 22 is a steam heat exchanger, and the dust removal device 23 is a cyclone dust remover. From the inlet end to the outlet end of the gas inner cycle channel 20, the cyclone dust remover, the draught fan 24, the filter, the condenser and the steam heat exchanger are arranged in sequence. In the drying process, the feed fed from the feed inlet 11 enters the blanking hopper 12 through the top drying box, the middle drying boxes and the bottom drying box in sequence to be conveyed to the material cooling unit. The gas absorbs heat from the material cooling unit and enters the bottom drying box through the return air duct 14. The gas enters the box body assembly on the lower side in sequence upwards. The gas enters the gas inner cycle channel 20 through the air ducts 102, and passes through the cyclone dust remover, the draught fan 24, the filter, the condenser and the steam heat exchanger in sequence. The gas is subjected to a dust removal treatment, a dehumidification treatment and a heating treatment in the gas inner cycle channel 20 to form hot dry gas. The hot dry gas is conveyed into the drying box group 1 from the outlet of the gas inner cycle channel 20, wherein part of the hot dry gas enters the box body assembly located on the upper side, and the other part of the hot dry gas enters the box body assembly located on the lower side to circulate. Finally, the damp hot gas containing a great amount of moisture is discharged into the gas treatment unit from the top drying box.

Optionally, an air door adjusting valve 5 is arranged between the material drying unit and the gas treatment unit, and the air door adjusting valve 5 is used for controlling the flow of the gas conveyed to the gas treatment unit from the material drying unit. When the gas at the outlet of the material drying unit is relatively high in temperature and relatively low in humidity, the gas flow can be reduced through the air door adjusting valve 5, so that the action time of the gas in the material drying unit is prolonged. When the gas at the outlet of the material drying unit is relatively low in temperature and relatively high in humidity, the gas flow can be increased through the air door adjusting valve 5, so that the action time of the gas in the material drying unit is shortened, and the drying efficiency is improved. In the embodiment, the gas treatment unit further comprises a gas pipeline 7. The gas pipeline 7 is used for communicating the drying box group 1 and the dust removal box body 3. The air door adjusting valve 5 is arranged at the end, close to the drying box group 1, of the gas pipeline 7.

Optionally, the new environmentally-friendly feed drying and cooling integrated machine further comprises an air supplementing device 6, and the air supplementing device 6 is connected with the material cooling unit. The gas cyclically circulates to be used in the new environmentally-friendly feed drying and cooling integrated machine. Because of safety pressure relief, air leakage and other factors, when the gas flow, pressure and other indicators in the circulation are lower than the design values, gas can be supplemented by the air supplementing device 6.

Optionally, the new environmentally-friendly feed drying and cooling integrated machine further comprises a rack and a control system. The rack plays an integral supporting role. The material cooling unit, the gas treatment unit and the material drying unit are all electrically connected with the control system.

The new environmentally-friendly feed drying and cooling integrated machine has the effects that the gas treatment unit is arranged, two ends of the gas treatment unit are respectively connected with the material drying unit and the material cooling unit, so that the gas cyclically circulates through the material drying unit, the gas treatment unit and the material cooling unit in sequence. A drying and cooling treatment on feed is realized through heat exchange between the gas and the feed, so that the gas is avoided from being exhausted into the environment, "zero discharge" of waste gas is realized, and the integrated machine has the characteristic of high environmental protection.

What is claimed is:

1. A new environmentally-friendly feed drying and cooling integrated machine, comprising:
   - a material drying unit, comprising a drying box group and a heating box body module, and the heating box body module being used for carrying out a drying treatment on materials in the drying box group so as to reduce a content of moisture in the materials;
   - a material cooling unit, connected to the material drying unit, receiving the materials from the drying box group, and carrying out a cooling treatment on the materials; and
   - a gas treatment unit, two ends of the gas treatment unit being respectively connected to the drying box group and the material cooling unit, and the gas treatment unit receiving gas discharged from the drying box group, carrying out a temperature reduction and dehumidification treatment on the gas, and then conveying the gas to the material cooling unit; and
   - the gas cyclically circulates through the material cooling unit, the gas drying unit and the gas treatment unit in sequence, and the gas can carry out a drying treatment and heat exchange with materials in the material drying unit and the materials in the material cooling unit.

2. The new environmentally-friendly feed drying and cooling integrated machine according to claim 1, wherein the gas treatment unit comprises a dust removal box body and a temperature reduction and dehumidification module, the dust removal box body is connected with the drying box group, the dust removal box body receives the gas discharged from the drying box group and carries out a dust removal treatment on the gas, two ends of the temperature reduction and dehumidification module are respectively connected with the dust removal box body and the material cooling unit, the temperature reduction and dehumidification module receives gas discharged from the dust removal box body, carries out a temperature reduction and dehumidification treatment on the gas, and then conveys the gas to the material cooling unit.

3. The new environmentally-friendly feed drying and cooling integrated machine according to claim 1, wherein the drying box group comprises a plurality of drying boxes which are connected end to end in sequence, the two drying boxes located at two ends are respectively connected with the gas treatment unit and the material cooling unit, and the materials are conveyed to the end, close to the material cooling unit, of the drying box group from the end, close to the gas treatment unit, of the drying box group.

4. The new environmentally-friendly feed drying and cooling integrated machine according to claim 3, wherein the drying boxes are distributed in a stack-up mode along a vertical direction, and the materials are conveyed to the drying box located at a bottom from the drying box located at a top in sequence.

5. The new environmentally-friendly feed drying and cooling integrated machine according to claim 3, wherein the material drying unit further comprises a gas inner cycle channel, the drying boxes are in pairs, the two drying boxes in each group are both connected with the gas inner cycle channel, and at least part of the gas can cyclically circulate in the two drying boxes through the gas inner cycle channel.

6. The new environmentally-friendly feed drying and cooling integrated machine according to claim 5, wherein the heating box body module comprises dehumidification equipment and heating equipment, the dehumidification equipment and the heating equipment are both arranged on the gas inner cycle channel, and the dehumidification equipment and the heating equipment respectively carry out a dehumidification treatment and a heating treatment on the gas in the gas inner cycle channel.

7. The new environmentally-friendly feed drying and cooling integrated machine according to claim 6, wherein the dehumidification equipment is a condenser, the heating equipment is a steam exchanger, the steam exchanger is located on a side closest to an outlet end of the gas inner cycle channel, the condenser is located on a side closest to an inlet end of the gas inner cycle channel, a filter is further arranged between the condenser and the inlet end of the gas inner cycle channel, and the filter is used for carrying out a filtration treatment on the gas in the gas inner cycle channel.

8. The new environmentally-friendly feed drying and cooling integrated machine according to claim 6, wherein the heating box body module further comprises a dust removal device, and the dust removal device is used for carrying out a dust removal treatment on the gas in the gas inner cycle channel.

9. The new environmentally-friendly feed drying and cooling integrated machine according to claim 1, wherein an air door adjusting valve is arranged between the material drying unit and the gas treatment unit, and the air door adjusting valve is used for controlling a flow of the gas conveyed to the gas treatment unit from the material drying unit.

10. The new environmentally-friendly feed drying and cooling integrated machine according to claim 1, further comprising an air supplementing device, wherein the air supplementing device is connected with the material cooling unit.

* * * * *